United States Patent [19]

Yoshimura et al.

[11] Patent Number: 4,764,965

[45] Date of Patent: Aug. 16, 1988

[54] APPARATUS FOR PROCESSING DOCUMENT DATA INCLUDING VOICE DATA

[75] Inventors: Susumu Yoshimura; Isamu Iwai, both of Kawasaki, Japan

[73] Assignee: Tokyo Shibaura Denki Kabushiki Kaisha, Kawasaki, Japan

[21] Appl. No.: 27,115

[22] Filed: Mar. 13, 1987

Related U.S. Application Data

[63] Continuation of Ser. No. 540,869, Oct. 11, 1983, abandoned.

[30] Foreign Application Priority Data

Oct. 14, 1982 [JP] Japan ............................... 57-180279

[51] Int. Cl.[4] ................................................ G06F 9/00

[52] U.S. Cl. ...................................................... 381/43

[58] Field of Search ............................... 364/200, 900; 381/41–48

[56] References Cited

U.S. PATENT DOCUMENTS 3,392,239 7/1968 Johnson ................................ 381/43

4,375,083 2/1983 Maxemchuk ........................ 364/900

4,430,726 2/1984 Kasday ................................ 364/900

FOREIGN PATENT DOCUMENTS 2088106 6/1982 United Kingdom .

*Primary Examiner*—Gareth D. Shaw

*Assistant Examiner*—John G. Mills

*Attorney, Agent, or Firm*—Oblon, Fisher, Spivak, McClelland & Maier

[57] ABSTRACT

A data processing apparatus permitting editing of document blocks associated with voice block data, wherein various document blocks, stored in a memory section, are read out and displayed on a display. A desired document block is designated by a cursor, and the corresponding voice data is input, thereby associating the desired document block with the corresponding voice block data which is stored in another memory section. Input sentences are divided into document blocks, to be edited and displayed. Even if the document block displayed is moved during editing, the voice data corresponding to the moved document block can be output, by operating a voice output key.

7 Claims, 7 Drawing Sheets

APPARATUS FOR PROCESSING DOCUMENT DATA INCLUDING VOICE DATA

This application is a continuation of application Ser. No. 540,869, filed on Oct. 11, 1983, now abandoned.

BACKGROUND OF THE INVENTION

This invention relates to an apparatus for processing document data including voice data, in which document data constituting document blocks are stored together with voice data, and voice data pertaining to a document block is output together with the document block, when the document data is read out for such purposes as the formation and correction of the document.

With the development of data processing techniques, document processing apparatuses have been developed, which can receive document blocks, such as character rows constituting sentences, drawings, tables, images, etc., and edit these document blocks in such a way as to form documents. In such apparatuses, the document data obtained by editing is usually visually displayed as an image display, the correction of the document or like operation being performed while monitoring the display.

There has also been an attempt to make use of voice data during the process of correcting a document. More specifically, by this approach, voice data pertaining to sentences and representing the vocal explanation of drawings, tables, etc., are input, together with the sentences, drawings, tables, etc., and such voice data is utilized for such purposes as the correction and retrieval of the document. In this case, voice data pertaining to the document image displayed is recorded on a tape recorder or the like. However, such voice data can only be recorded for one page of a document, at most. Therefore, in the process altering or correcting a document, situation occur wherein voice data no longer coincide with the equivalent position(s) of a page, following alteration or correction. In such cases, it is then necessary to re-input the voice data. In other words, since it has hitherto been difficult to shift the voice data so that it corresponds to re-located and/or corrected character data or to simply execute correction, deletion, addition, etc., when correcting and editing documents, voice data pertaining to the documents cannot be utilized effectively via this method.

Meanwhile, techniques have been developed for the analog-to-digital conversion of voice data and for editing digital data by coupling it to a computer system. However, no algorithm has yet been established for an overall process of forming documents by combining document data and voice data. For this reason, it is impossible to freely add voice data for desired document data.

SUMMARY OF THE INVENTION

Since the present invention has been contrived in view of the above, its object is to provide an apparatus for processing document data including voice data, which device is highly practical and useful in that it permits voice data to be effectively added to document data, so that said voice data can be utilized effectively in the formation and correction of documents.

To attain the above object of the invention, an apparatus is provided for the processing of document data including voice data, which apparatus comprises: first memory means for editing input document data consisting of document blocks and storing the edited document data; display means connected to the memory means for displaying document data read out from the memory means; means for designating a desired document block among the displayed document data; means for coupling voice data corresponding to the document block designated by the designating means; and second memory means connected between the specifying means and voice data input means, for storing input voice data in correspondence with the designated document block, said designated document block being capable of being read out as document data with voice data when forming a document.

With the apparatus for processing document data and voice data, according to the present invention, the vocal explanation of document data constituting document blocks can be written and read out as voice data added to the document block, thus, voice data can be moved along with corresponding document blocks, when correcting, adding, and deleting document blocks in the processes of editing of a document. In other words, there is no need for the cumbersome method of recoupling voice data or editing voice data separately from the document data, as in the prior art. Further, even an item which cannot be explained by document data alone can be satisfactorily explained by the use of voice data. According to the invention, it is thus possible to simplify the document editing and correcting operations, thereby enhancing the reliability of the document editing process.

Figure 6:
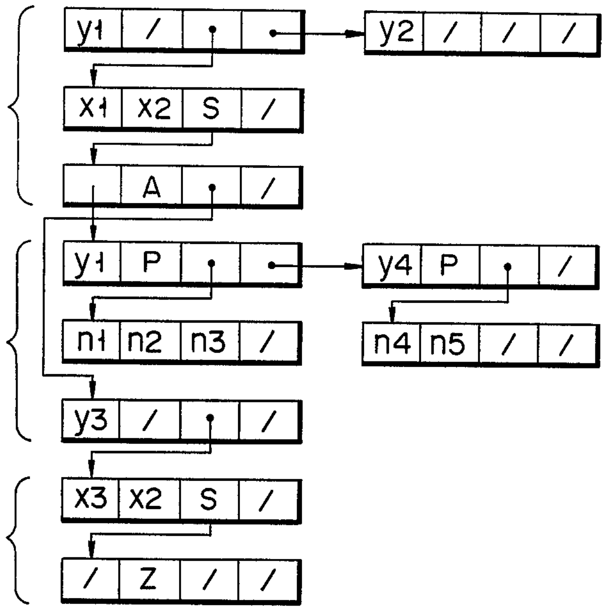
Figure 7:
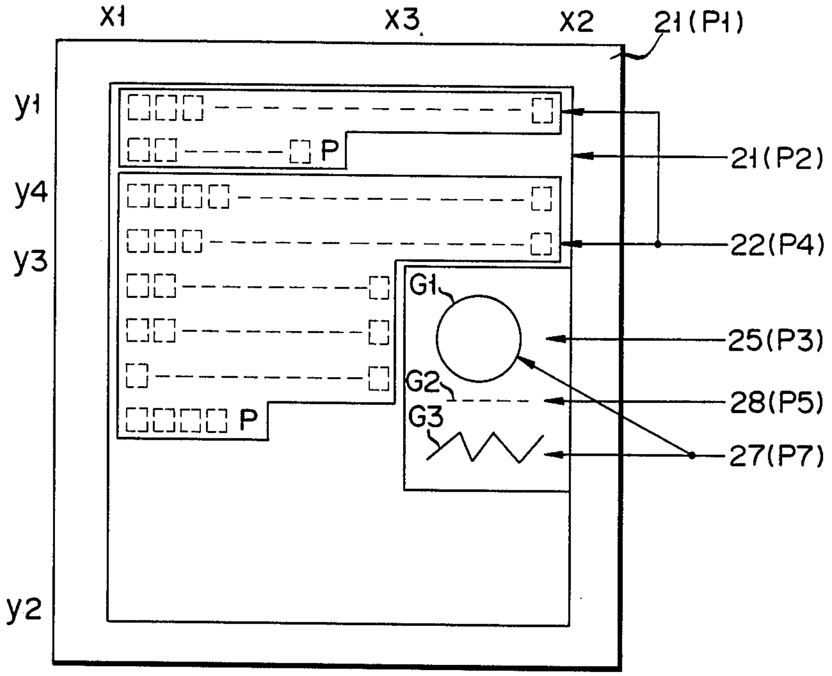
Figure 8:
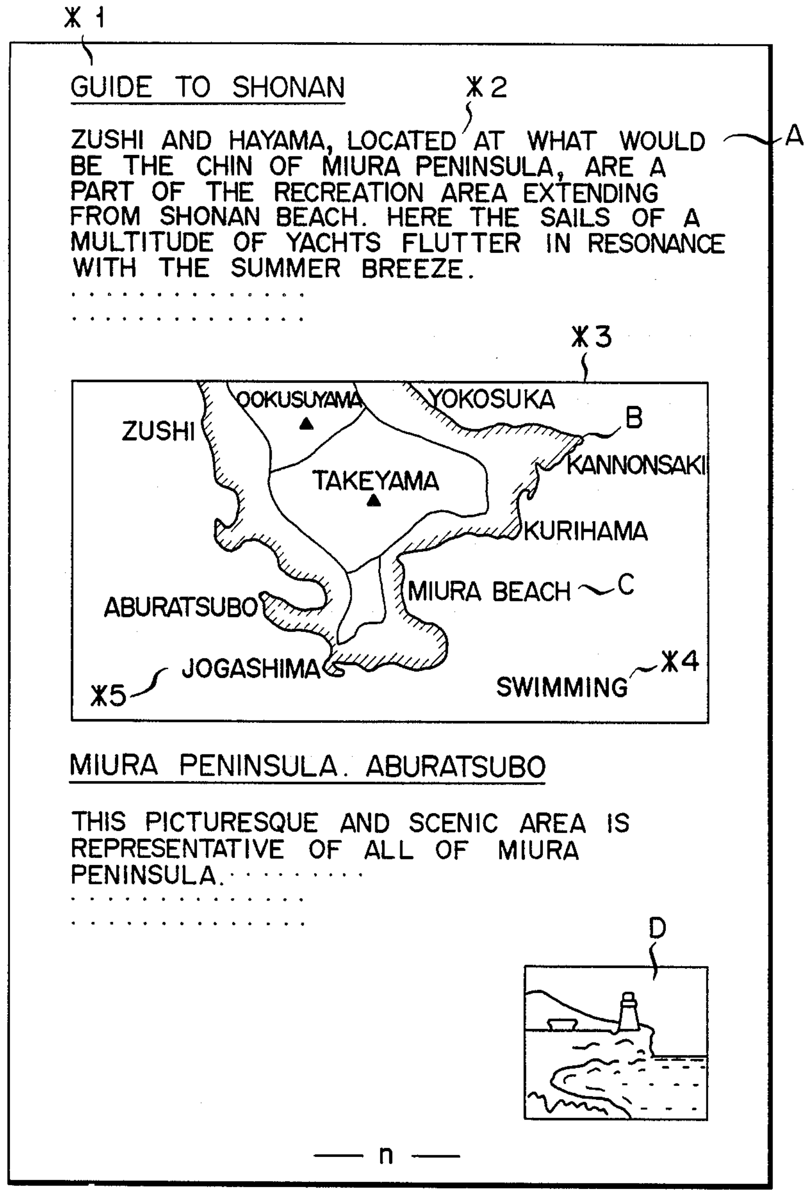

FIGS. $5A_1$ to $5A_6$ are views of data formats of document blocks;

FIG. 6 is a view of data which is produced according to the detection of the position, in the written text of a designated sentence block, and which is then stored in a file;

FIG. 7 is a view of the positions on a screen of addresses $X_1$–$X_3$; $Y_1$–$Y_4$ shown in FIG. 6; and FIG. 8 is a view of a document containing pictures.

DETAILED DESCRIPTION OF THE PREFERRED EMBODIMENTS

Figure 1:
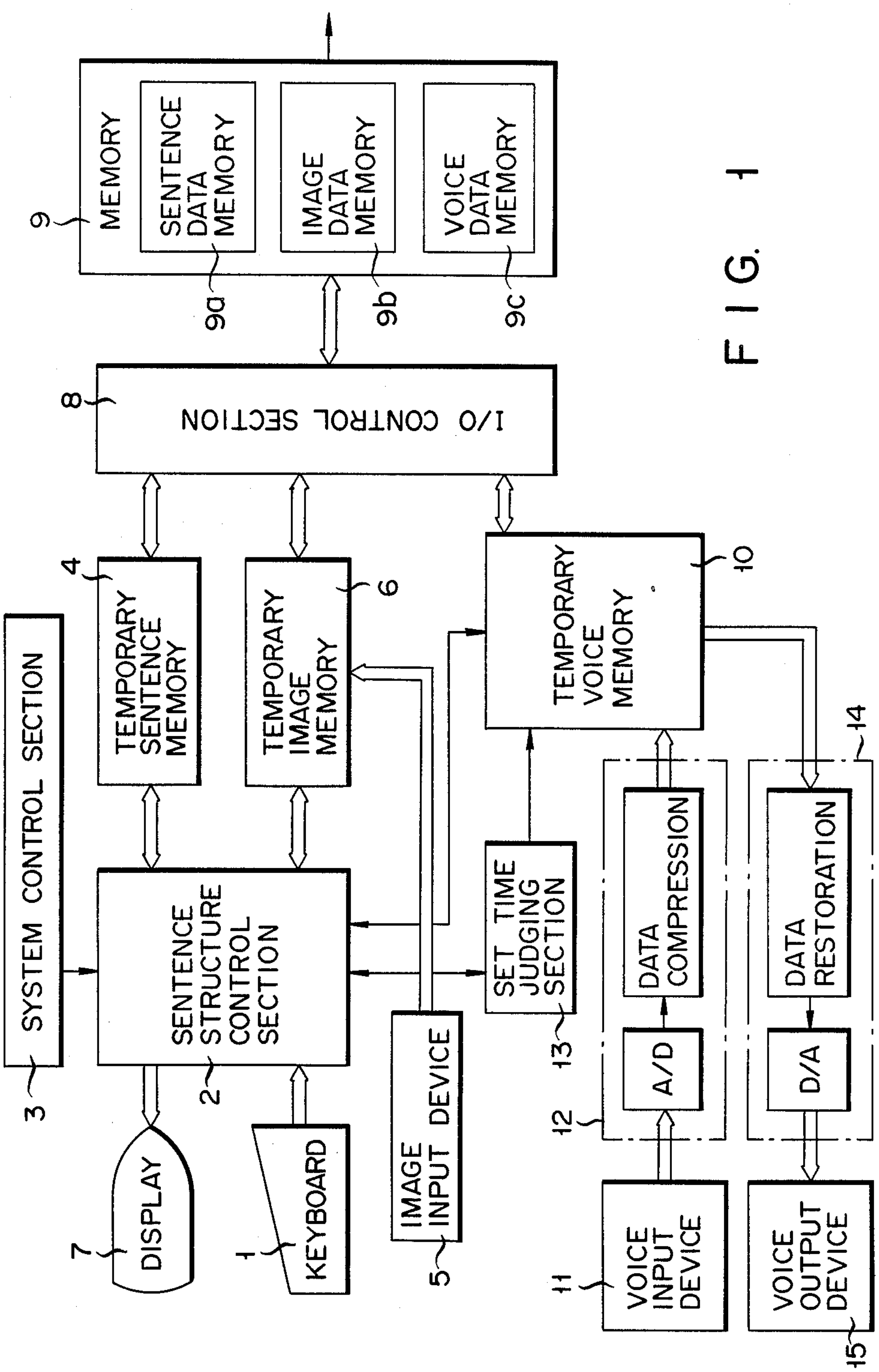
FIG. 1 is a block diagram of an embodiment of the present invention.

FIG. 1 schematically shows an embodiment of the apparatus according to the invention. Various control signals and sentence data consisting of character row data are supplied from a keyboard device 1 to a sentence structure control section 2. The sentence structure control section 2 operates under the control of a system control section 3, to edit the input data, e.g., by dividing the sentence data into divisions for respective paragraphs and converting data characters into corresponding Chinese characters, to form the edited sentence data. The edited sentence data thus formed is temporarily stored in a temporary sentence memory 4. Document blocks such as drawings, tables, images, etc., which form a single document along with the edited sentence data noted above, are supplied from an image input device 5 to a temporary image memory 6 and temporarily stored in the same. The document block drawings and tables may also be produced in the sentence structure control section 2, by supplying their elements from the keyboard device 1. The sentence structure control section 2 edits the document data stored in memories 4 and 6. The edited document data is displayed on a display device 7, such as a CRT. It is also supplied, along with editing data, to a sentence data memory 9*a* and image data memory 9*b* in a memory 9, via an input/output control section 8.

The apparatus further comprises a temporary voice memory 10. Voice data from a voice input device 11 is temporarily stored in temporary voice memory 10, after analog-to-digital conversion and data compression, via a voice data processing circuit 12. Such data is stored in correspondence to designated document blocks of the edited document data noted above, under the control of the sentence structure control section 2, as will be described hereinafter in greater detail. It is also supplied, along with time data provided from a set time judging section 13, to a voice data memory 9*c* in memory 9, via the input/output control section 8, to be stored in memory 9*c* in correspondence to the designated document blocks noted above. Further, such data is read out from voice data memory 9*c;* i.e., in correspondence to the designation of desired document blocks of the document data. The read-out voice data is temporarily stored in the temporary voice memory 10, to be coupled to a voice output device 15 after data restoration and digital-to-analog conversion, via a voice processing circuit 14, in such a way as to be sounded from voice output device 15.

Keyboard device 1 has character input keys, as well as various function keys for coupling various items of control data, e.g., a voice input key, an insert key, a delete key, a correction key, a cancel key, a voice editor key, a voice output key, cursor drive keys, etc. The functions of these control data keys will be described in detail below.

Figure 2:
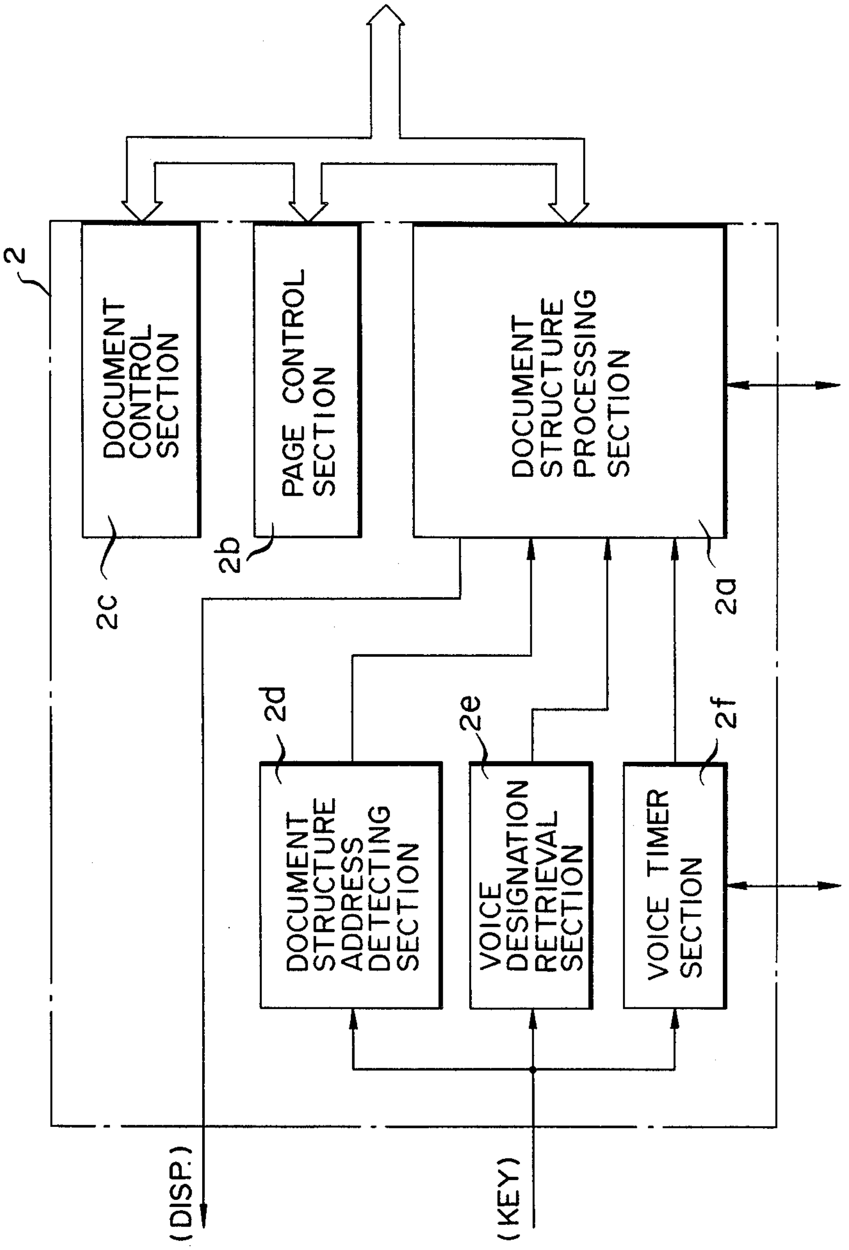
FIG. 2 is a block diagram of the sentence structure control section shown in FIG. 1.

FIG. 2 shows sentence structure control section 2. As is shown, section 2 includes a document structure processing section 2*a*, a page control section 2*b*, a document control section 2*c*, a document structure address detection section 2*d*, a voice designation/retrieval section 2*e*, and a voice timer section 2*f*. Data supplied from the keyboard device 1 is fed to the document structure address-detection section 2*d*, voice designation/retrieval section 2*e* and voice timer section 2*f*. Voice timer section 2*f* receives data from time instant judging section 13, under the control of a signal from the keyboard device 1, and supplies it to document structure processing section 2*a*, which 2*a* processes input data on the editing, formation, correction, and display of sentences, as shown in FIG. 3.

Figure 3:
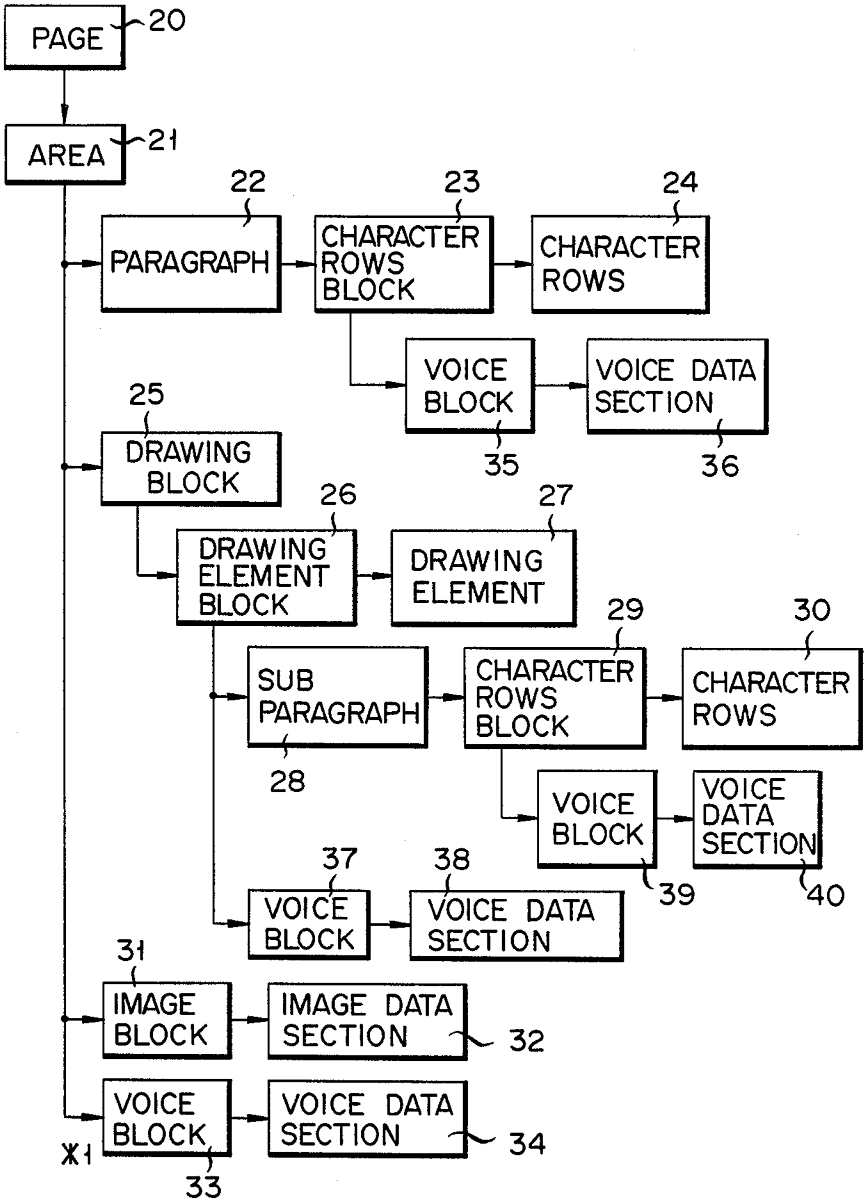
FIG. 3 is a view of a sentence structure.
Figure 5:
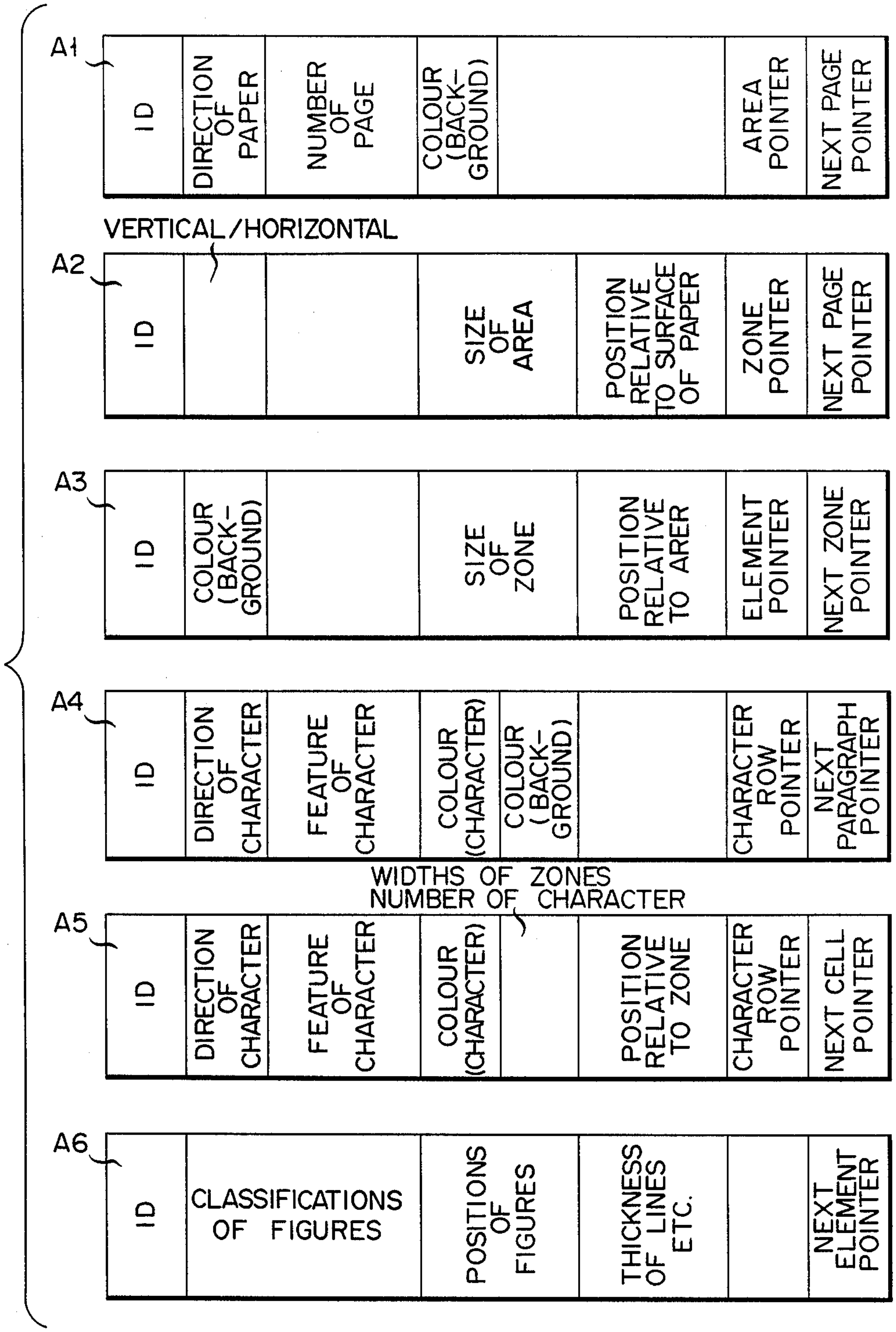

Referring to FIG. 3, reference numeral 20 designates a page of a document image. Its data configuration is as shown in FIG. 5$A_1$. Reference numeral 21 represents an area indicative of the arrangement of document data filling one page of the document image noted above. Its data configuration is as shown in FIG. 5$A_2$. The relative address and size of the area noted can be ascertained from the page reference position thereof, with reference to FIG. 5$A_2$.

Reference numeral 22 designates a sentence zone filled by character rows in the area noted above. It defines a plurality of paragraphs, and its data configuration is as shown in FIG. 5$A_4$. As is shown, the size of characters, the interval between adjacent characters, interval between adjacent lines, and other specifications concerning characters, are given.

Reference numeral 25 represents a zone which is filled by drawings or tables serving as document blocks. Its data structure is as shown in FIG. 5$A_3$. The position of the zone relative to the area noted above, its size, etc., are defined.

Reference numeral 28 represents a sentence zone full of rows of character, included in the drawing/table zone. Its data configuration is as shown in FIG. 5$A_5$. The relative position of this zone with respect to the drawing/table zone, its width, etc., are defined as a sub-paragraph.

Reference numeral 27 represents a drawings element in a drawing zone. Its data configuration is as shown in FIG. 5$A_6$. This zone is defined by the type of drawing, the position thereof, the thickness of drawing lines, etc.

The document structure data which has been analyzed in the manner described is stored as a control table in page control section 2*b* for all documents. The voice designation/retrieval section 2*e* retrieves and designates given voice data added to document elements, and also makes voice data correspond to designated document blocks when correcting document data. The document structure address-detection section 2*d* detects use of key-operated cursors by the positions of document elements in the document structure specified on the displayed document image.

For the processing of detection data, the corresponding data shown in FIG. 6 is formed with reference to a correspondence table and is temporarily stored in a storage file (not shown). The reference symbols $X_1$, $X_2$, $X_3$, and $Y_1$ to $Y_4$, shown in FIG. 6 correspond to the pertinent addresses shown in FIG. 7. These addresses permit discrimination of areas or zones, to which designated positions on the screen belong. The leading addresses of areas, paragraphs, and zones in the data configuration are detected according to the results of discrimination. This correspondence data is developed on the correspondence table, only with respect to the pertinent data to be edited.

Figure 4:
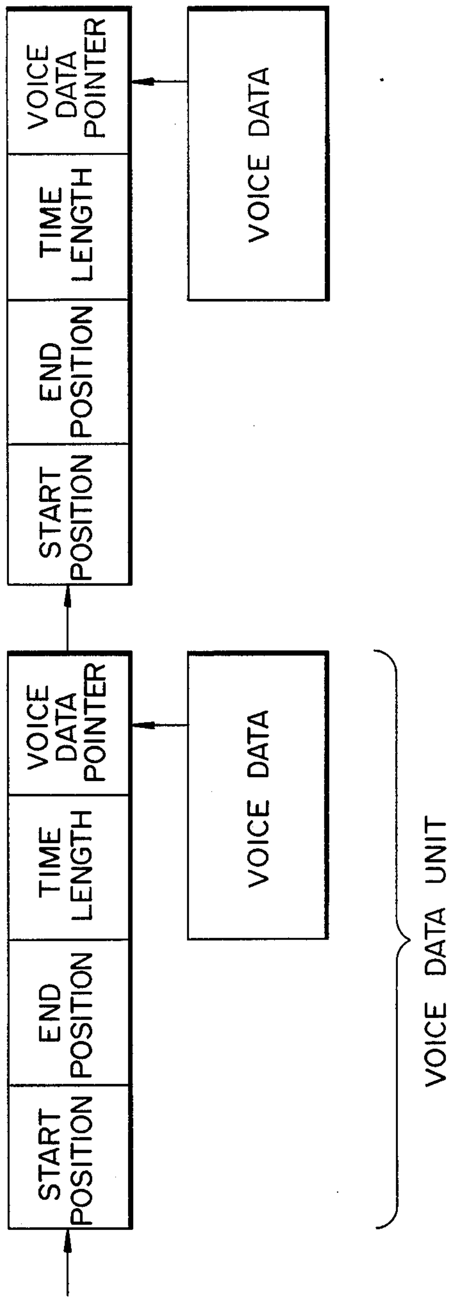
FIG. 4 is a view of a memory format of voice data.

To designate a document element in the displayed document image, for which voice data is to be coupled, cursors are moved to the start and end positions of the document element. As a result, pointers corresponding to the start and end positions are set. Coupled voice data is registered along with these pointers as is data on the start and end positions of the sentence structure and time length of the voice data, e.g., as exemplified in the format shown in FIG. 4.

The operation of the apparatus having the above construction can be described as follows.

Each page 20 of the input document data has the form shown in FIG. 3. Area 21 shows the arrangement pattern of the sentence data on that page 20. The sentence data is then divided into paragraphs 22, which are then structurally analyzed for the individual rows 23 of characters. Rows 24 of character, constituting respective blocks of character stored for these blocks 23. Meanwhile, drawing blocks 25 in the document are regarded as drawing blocks 26 and stored as respective drawing elements 27. Further, the rows characters of words, or the like, that are written in a drawing block are analyzed as a drawing element block 26 and are regarded as a sub-paragraph 28. A character row block 29 and character rows 30 are stored with respect to the sub-paragraph 28. A picture or image in the document is detected as an image block 31 and is stored as image data 32.

By designating page 21 containing document data having the structure analyzed in the above way, and by coupling a vocal explanation or like to the voice input device 11, a voice block 33 is set, and the voice data thereof is stored in a voice data section 34. For example, when voice data vocalizing "In the Shonan regions, the weather . . . " is coupled to the portion labeled *1 in FIG. 8, the voice data is stored in voice data section 34 with *1 (Shonan) as a keyword. Subsequently, time interval data (35 seconds) for this voice data is also stored. When voice data vocalizing "Zushi and Hayama . . . " is coupled by designating a portion labeled *2, a voice block 35 is set in correspondence to character row block 23, and the voice data thereof is stored in a voice data section 36 with *2 (Zushi and Hayama) designating the keywords. The time interval in this case is 10 seconds. When voice data vocalizing "This map covers the Miura Peninsula and . . . " continues for 15 seconds, by designating the map labeled *3, a voice block 37 is set in correspondence to the drawing element block 26, and the voice data is stored in a voice data section 38. When voice data vocalizing "Beaches in the neighborhood of Aburatsubo . . . " continues for 20 seconds, by designating a portion labeled *4, a voice block 39 is set in correspondence to the character row block 29, and the voice data is stored in a voice data section 40.

In the above described way, the input voice data is related to the designated document blocks. The character row blocks 23 in paragraph 22 prescribe data concerning character rows 24 (i.e., the type of characters, the interval between adjacent characters, etc.). The voice block prescribes data concerning voice data (i.e., the type of compression of the voice, the speed of voice, the intervals between adjacent sections, etc.).

As has been shown, voice data can be coupled by moving cursors, to designate a desired portion of the displayed document image as the document block and, then, by coupling the voice while operating the voice input key.

When editing and correcting a document with the voice data added in correspondence to the individual document elements in the manner described, a desired document block in the displayed document image is designated and the voice output key is then operated. By so doing, the position of the designated document block in the structure of the displayed document can be ascertained. In correspondence to this position in the document structure, the voice data related to the designated document element is read out, and the pertinent voice data is reproduced.

The embodiment described above is given for the purpose of illustration only, and various changes and modifications thereof can be made. For example, the system of designating a desired document element and the form of the coupling voice may be appropriately determined, according to the specifications. Further, sentence data, image data, and voice data may be identified by using tables, instead of by storing it in the respective memory sections. In general, individual items of data may be stored in any way, as long as their correspondence relationship is maintained.

What is claimed is:

1. An apparatus for forming and editing of a document having sentences associated with voice information, wherein when sentences are rearranged in the document during editing of the document, the voice information retains its association with respective of the sentences, comprising:

first memory means for storing document data which have been input and edited, said document data including a plurality of document blocks each including an address pointer which is indicative of a structure of data, said address pointer relating each document block with the others when document blocks are edited;

display means connected to said first memory means, for displaying document data read out from said first memory means;

designating means for designating, by a cursor, a desired document block from among the displayed document data;

means for associating the document block designated by said designating means, with voice data corresponding to said document block, by means of the address pointer, and second memory means connected between said designating means and voice data input means, for storing the input voice data in correspondence to said designated document block by means of said address pointer, said designated document block being read out together with the voice data associated therewith when forming a document.

2. The apparatus according to claim 1, wherein said first memory means can store character row blocks, drawing blocks, table blocks and image blocks, as document blocks.

3. The apparatus according to claim 2, wherein said character row blocks each include character rows to be stored, and wherein a voice block including voice data to be stored is associated with a given character row block.

4. The apparatus according to claim 2, wherein said drawing blocks each include drawing element blocks comprised of a drawing element to be stored, wherein character rows in said drawing blocks are each regarded as a portion of paragraph including of a character row block, and wherein a voice block including voice data to be stored is associated with a drawing element block or a character row block.

5. The apparatus according to claim 2, wherein a voice block including a voice to be stored is associated with any one of said image blocks.

6. An apparatus for forming and editing of a document which includes sentence data in the form of character strings and non-sentence data in the form of voice data, comprising:

first memory means for storing document data which have been input and edited, said document data including a plurality of document blocks each including a pointer which is indicative of a structure of data, said pointer relating each document block with the others when document blocks are edited;

display means connected to said first memory means, for displaying document data read out from said first memory means;

designating means for designating a desired document block from among the displayed document data;

input means for inputting said non-sentence data;

means for associating the document block designated by said designating means, with non-sentence data corresponding to said document block, by means of the pointer; and second memory means connected between said designating means and input means, for storing the input non-sentence data in correspondence to said designated document block, said designated document block being read out together with the non-sentence data associated therewith when forming a document.

7. An apparatus according to claim 6, wherein the non-sentence data also comprises data in the form of a figure.

* * * * *